(12) United States Patent
Ergin et al.

(10) Patent No.: US 7,558,992 B2
(45) Date of Patent: Jul. 7, 2009

(54) REDUCING THE SOFT ERROR VULNERABILITY OF STORED DATA

(75) Inventors: Oguz Ergin, Ankara (TR); Osman Unsal, Barcelona (ES); Xavier Vera, Barcelona (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 10/563,169

(22) PCT Filed: Oct. 10, 2005

(86) PCT No.: PCT/ES2005/070144

§ 371 (c)(1),
(2), (4) Date: Dec. 29, 2005

(87) PCT Pub. No.: WO2007/042581

PCT Pub. Date: Apr. 19, 2007

(65) Prior Publication Data

US 2007/0094560 A1   Apr. 26, 2007

(51) Int. Cl.
*G06F 11/00* (2006.01)
(52) U.S. Cl. .............. 714/701; 714/2; 714/3; 714/6; 714/42; 714/54; 714/718; 714/719; 714/746; 714/764; 714/799; 714/818; 714/819; 365/185.09; 365/201

(58) Field of Classification Search .............. None
See application file for complete search history.

(56) References Cited

U.S. PATENT DOCUMENTS

| | | | | |
|---|---|---|---|---|
| 5,771,247 | A * | 6/1998 | Allen et al. ............. | 714/763 |
| 6,038,680 | A * | 3/2000 | Olarig .................... | 714/6 |
| 6,557,083 | B1 * | 4/2003 | Sperber et al. ........... | 711/144 |
| 6,631,493 | B2 * | 10/2003 | Ottesen et al. ........... | 714/774 |
| 6,944,720 | B2 * | 9/2005 | Sperber et al. ........... | 711/144 |
| 2001/0001158 | A1 | 5/2001 | Tetrick | |

FOREIGN PATENT DOCUMENTS

| | | |
|---|---|---|
| EP | 0520676 A2 | 12/1992 |
| ES | PCT/ES2005/070144 | 10/2005 |

* cited by examiner

*Primary Examiner*—John P Trimmings
(74) *Attorney, Agent, or Firm*—Thomas R. Lane (57) ABSTRACT

Embodiments of apparatuses and methods for reducing the soft error vulnerability of stored data are disclosed. In one embodiment, an apparatus includes storage logic, determination logic, and selection logic. The determination logic is to determine a condition of a dataword. The storage logic includes logic to store a first portion of the dataword, a second portion of the dataword, and a result generated by the determination logic. The selection logic is to select, based on the contents of the storage logic to store the result, either the contents of the storage logic to store the second portion of the dataword, or a replacement value. The replacement value depends on the contents of a predetermined bit of the storage logic to store the first portion of the dataword.

21 Claims, 8 Drawing Sheets

REDUCING THE SOFT ERROR VULNERABILITY OF STORED DATA

CROSS-REFERENCE TO OTHER APPLICATIONS

This application is a National Phase application of, and claims priority to, International Application No. PCT/ES2005/070144, filed Oct. 10, 2005 entitled "REDUCCIÓN DE LA VULNERABILIDAD ANTE ERRORES DE SOFTWARE DE DATOS ALMACENADOS."

BACKGROUND

1. Field

The present disclosure pertains to the field of data processing, and more particularly, to the field of error mitigation in data processing apparatuses.

2. Description of Related Art

As improvements in integrated circuit manufacturing technologies continue to provide for smaller dimensions and lower operating voltages in microprocessors and other data processing apparatuses, makers and users of these devices are becoming increasingly concerned with the phenomenon of soft errors. Soft errors arise when alpha particles and high-energy neutrons strike integrated circuits and alter the charges stored on the circuit nodes. If the charge alteration is sufficiently large, the voltage on a node may be changed from a level that represents one logic state to a level that represents a different logic state, in which case the information stored on that node becomes corrupted. Generally, soft error rates increase as circuit dimensions decrease, because the likelihood that a striking particle will hit a voltage node increases when circuit density increases. Likewise, as operating voltages decrease, the difference between the voltage levels that represent different logic states decreases, so less energy is needed to alter the logic states on circuit nodes and more soft errors arise.

Blocking the particles that cause soft errors is extremely difficult, so data processing apparatuses often include support for error correcting codes ("ECC"), parity, or other techniques for detecting, and sometimes correcting, soft errors. Depending on the particular technique used, and the extent to which it is implemented, the cost of this support may be additional hardware and reduced performance, and the level of detection or correction capability may be limited to one or two bit errors. Alternative error mitigation techniques, which may offer different cost and capability options to designers of data processing apparatuses, may be desired.

BRIEF DESCRIPTION OF THE FIGURES

The present invention is illustrated by way of example and not limitation in the accompanying figures.

DETAILED DESCRIPTION

The following describes embodiments of apparatuses and methods for reducing the soft error vulnerability of stored data. In the following description, numerous specific details, such as storage logic configurations, may be set forth in order to provide a more thorough understanding of the present invention. It will be appreciated, however, by one skilled in the art, that the invention may be practiced without such specific details. Additionally, some well known structures, circuits, techniques, and the like have not been described in detail, to avoid unnecessarily obscuring the present invention.

Embodiments of the present invention may reduce the soft error vulnerability of stored data by taking advantage of the fact that many of the data values used in data processing apparatuses are narrower, in terms of the number of bits, than the registers, queues, buffers, caches, data holding latches, or other storage logic that are provided to store them. Therefore, these narrow values are often sign-extended or otherwise widened, resulting in the storage of data in bit locations that is not required for correct execution by the data processing apparatus. Embodiments of the present invention provide for soft errors to data in these bit locations to be ignored when the data is not required, and for these bit locations to be used to redundantly store other data to make that data less vulnerable to soft errors. Embodiments of the present invention may be used alone or in conjunction with other error detection, correction, or mitigation techniques.

Figure 1:
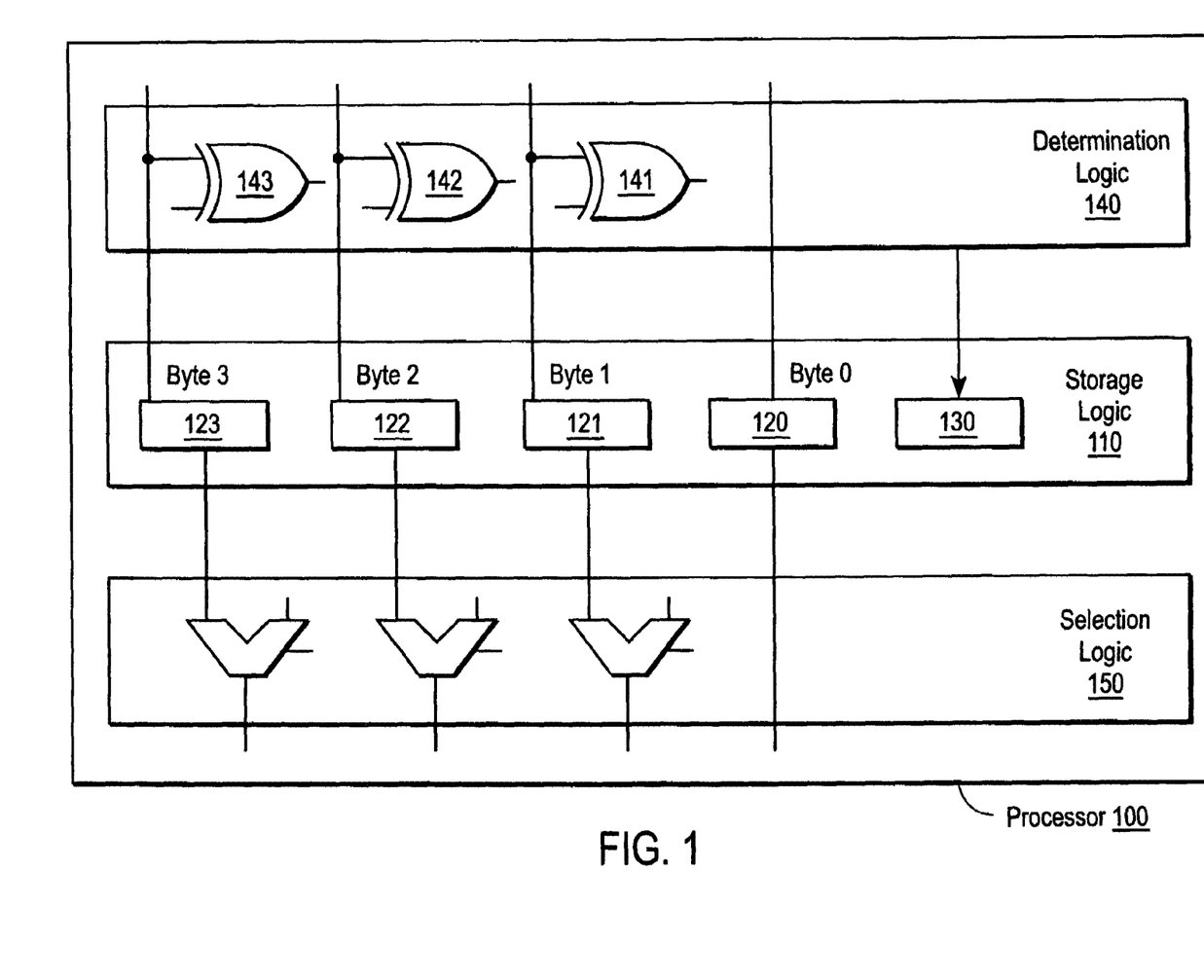
FIG. 1 illustrates an embodiment of the present invention in a processor having storage logic and narrow value determination logic.

FIG. 1 illustrates an embodiment of the present invention in processor 100. Processor 100 may be any of a variety of different types of processors, such as a processor in the Pentium® Processor Family, the Itanium® Processor Family, or other processor family from Intel Corporation, or any other general purpose or other processor from another company. Although FIG. 1 illustrates the invention embodied in a processor, the invention may alternatively be embodied in any other type of data processing component or apparatus, such as a chipset, any type of memory, including main system or disk memory, a bus or interconnect, or any other component that stores or transmits information.

Processor 100 includes storage logic 110, which may be any logic or circuit to store data, such as a register, an instruction or other type of queue or buffer, a data or other type of cache, a data holding or other latch, or any other memory structure, where data may be any type of information, including instructions, represented by binary digits ("bits") or in any other form. Storage logic 110 may be built from any type of storage element, such as latches or flip-flops. In this description, "0" (or "zero") and "1" (or "one") may be used to describe bit values, where the former may be any voltage or other level that represents a logical "zero" or "off" value, and the latter may be any such level that represents a logical "one" or "on" value. If every bit of a byte, word, or any other quantity of data has a "0" value, that quantity of data may be described as having a value of zero.

In the embodiment of FIG. 1, storage logic 110 is designed to store one word of data (a "dataword"), where one word is four bytes, and one byte is eight bits. However, in other embodiments, the corresponding storage logic may be designed to store any other quantity of data or size of a data value, and a dataword may be any other number of bytes or bits. Storage logic 110 includes byte-0 storage logic 120, byte-1 storage logic 121, byte-2 storage logic 122, byte-3 storage logic 123, and indicator storage logic 130. Each of byte-0, byte-1, byte-2, and byte-3 storage logic 120, 121, 122, and 123, respectively, is to store a portion, in this embodiment a byte, of a dataword. In this embodiment, byte-0 storage logic 120 is to store the lowest order byte of a dataword, byte-1 storage logic 121 is to store the second lowest order byte, byte-2 storage logic 122 is to store the third lowest order byte, and byte-3 storage logic 123 is to store the highest order byte.

Processor 100 also includes determination logic 140. Determination logic 140 may be any logic or circuitry to determine a condition of a dataword to be stored in storage logic 110. In this embodiment, the condition is that the dataword is a narrow value, where a narrow value is a sign-extended byte of data. For example, the dataword "00000000 00000000 00000000 01010101" is a sign-extended version of the byte "01010101" where the "0" in the most significant bit of the byte is used to indicate that the value of the byte is a positive number. As another example, "11111111 11111111 11111111 11010101" is a sign-extended version of "11010101" where the "1" in the most significant bit of the byte is used to indicate that the value of the byte is a negative number. Any form of coding, such as two's complement or one's complement, may be used within the scope of the present invention.

In the embodiment of FIG. 1, determination logic 140 includes byte-1 comparator 141, byte-2 comparator 142, and byte-3 comparator 143. Each comparator 141, 142, and 142 may include one exclusive-OR gate per bit, to determine whether every bit of the respective byte is equal to the highest order bit of byte-0 of the dataword. Alternatively, determination logic 140 may include leading zero and/or leading one detectors implemented in dynamic or any other type of logic family or circuit family configuration, or may be implemented using any other approach to determining the existence of a condition. Determination logic 140 generates a result to indicate the whether the condition exists, for example, in this embodiment, whether the dataword to be stored in storage logic 110 is a narrow value, i.e., every bit of byte-1, byte-2, and byte-3 is equal to the highest order bit of byte-0.

Indicator storage logic 130 is to store a result generated by determination logic 140, in this embodiment, a single bit (an "indicator bit") to indicate whether the corresponding dataword is a narrow value.

After a dataword and the corresponding indicator bit are stored in storage logic 110, a soft error might occur in one or more of the bits of storage logic 110, due to a particle strike or other event or events. Therefore, processor 100 also includes selection logic 150 to select either the contents of the upper order bytes of storage logic 110 or replacement values for these bytes. The selection is based on the contents of indicator storage logic 130. If the contents of indicator storage logic 130 indicate that the dataword stored in storage logic 110 is a narrow value, then, when data is read or otherwise provided from storage logic 110, only the contents of byte-0 storage logic 120 are actually-read. The values provided for the upper order bytes are obtained by sign-extending the data read from byte-0 storage logic 120. In this way, one or more soft errors in the upper order bytes of a narrow value may be ignored.

Selection logic 150 may include multiplexers controlled by the contents of indicator storage logic 130, for example, one multiplexer per bit to provide either the value of the bit stored in the corresponding bit of byte-1, byte-2, or byte-3 storage logic 121, 122, or 123, respectively, or the value of bit stored in the highest order location of byte-0 storage logic 120. In addition or alternatively, selection logic 150 may include multiplexers to provide either the former as described above, or a hardwired logic value of zero or one, as may be useful in one of the alternative embodiments described below.

Various alternative embodiments of the invention are possible. For example, determination logic 140 may determine whether the value of each of the upper order bytes is zero, indicator storage logic 130 may include a single bit to indicate that the value of each of the upper order bytes is zero, and selection logic 150 may provide a replacement value of zero for each of the upper order bytes. Or, determination logic 140 may determine whether the value of every bit of each of the upper order bytes is one, indicator storage logic 130 may include a single bit to indicate that the value of every bit of each of the upper order byte is one, and selection logic 150 may provide a replacement value of one for every bit of each of the upper order bytes. Or, determination logic 140 may determine both of the above, indicator storage logic 130 may include one bit to indicate the value of each of the upper order bytes is zero and another bit to indicate that the value of every bit of each of the upper order byte is one, and selection logic 150 may provide the appropriate replacement value.

Figure 2:
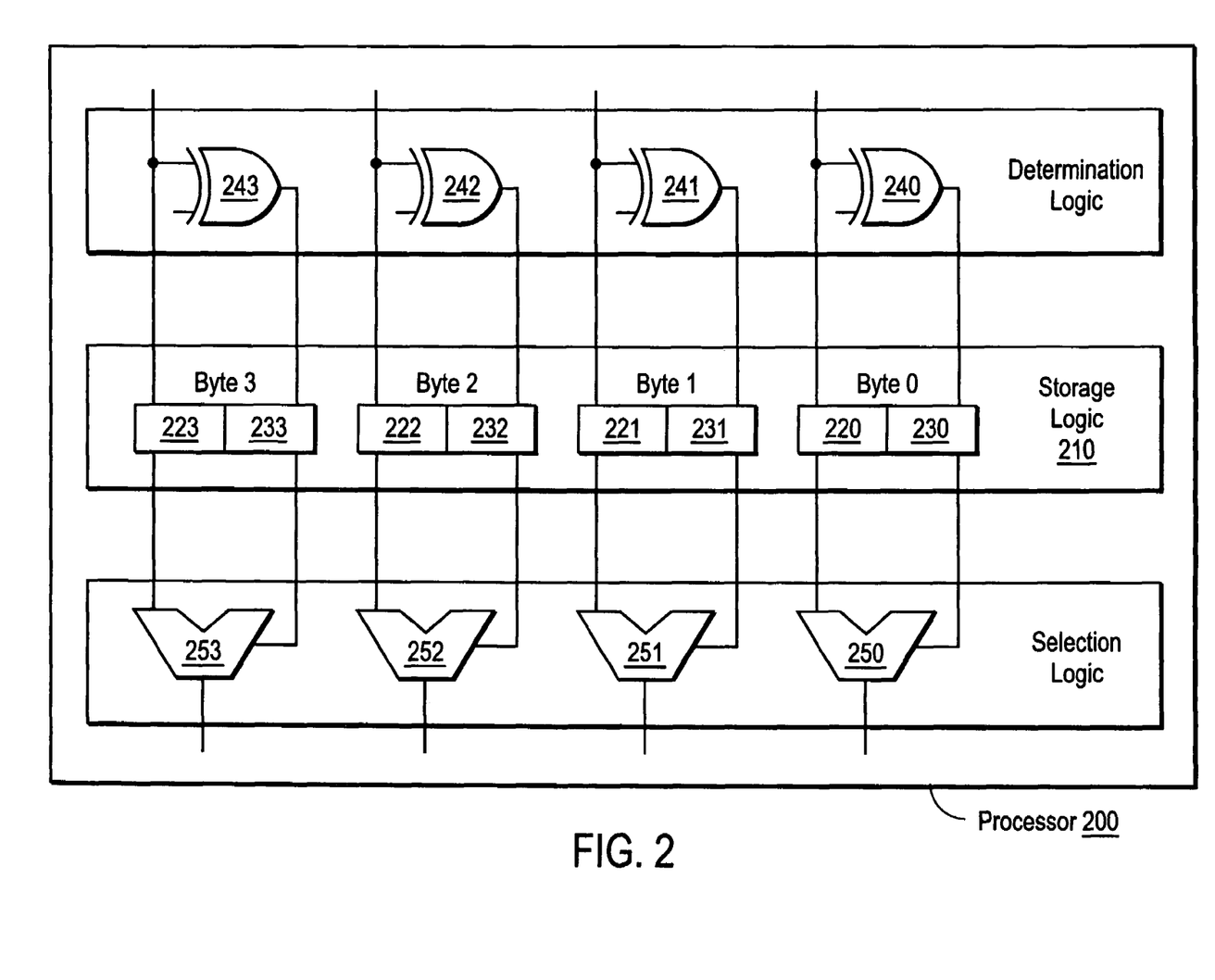
FIG. 2 illustrates an embodiment of the present invention in a processor having storage logic and zero byte determination logic.

Another alternative embodiment is illustrated in FIG. 2. FIG. 2 shows processor 200, which includes storage logic 210. Again, in this embodiment and any other embodiment described below, any type of processor and storage logic may be used, and the storage logic may be used for any function in the processor.

Storage logic 210 includes byte-0 storage logic 220, byte-1 storage logic 221, byte-2 storage logic 222, byte-3 storage logic 223, byte-0 indicator storage logic 230, byte-1 indicator storage logic 231, byte-2 indicator storage logic 232, and byte-3 indicator storage logic 233.

Processor 200 also includes byte-0 determination logic 240, byte-1 determination logic 241, byte-2 determination logic 242, and byte-3 determination logic 243, each of which determine whether the corresponding byte of the dataword to be stored in storage logic 210 is equal to zero. If it is, the corresponding indicator bit is set in byte-0 indicator storage logic 230, byte-1 indicator storage logic 231, byte-2 indicator storage logic 232, or byte-3 indicator storage logic 233.

Processor 200 also includes byte-0 selection logic 250, byte-1 selection logic 251, byte-2 selection logic 252, and byte-3 selection logic 253. Each of these is to select either the contents of the corresponding byte of storage logic 210 or replacement values for these bytes. The selection is based on the contents of the corresponding indicator storage logic 230, 231, 232, or 233. The replacement value in this embodiment is a zero byte. In another embodiment, where the determination logic is to determine whether every bit of a byte of the dataword to be stored is equal to one, the replacement value may be a "11111111" value.

In the embodiment of FIG. 2, any byte, including the lowest order byte, or any combination of bytes, may be replaced.

Figure 3:
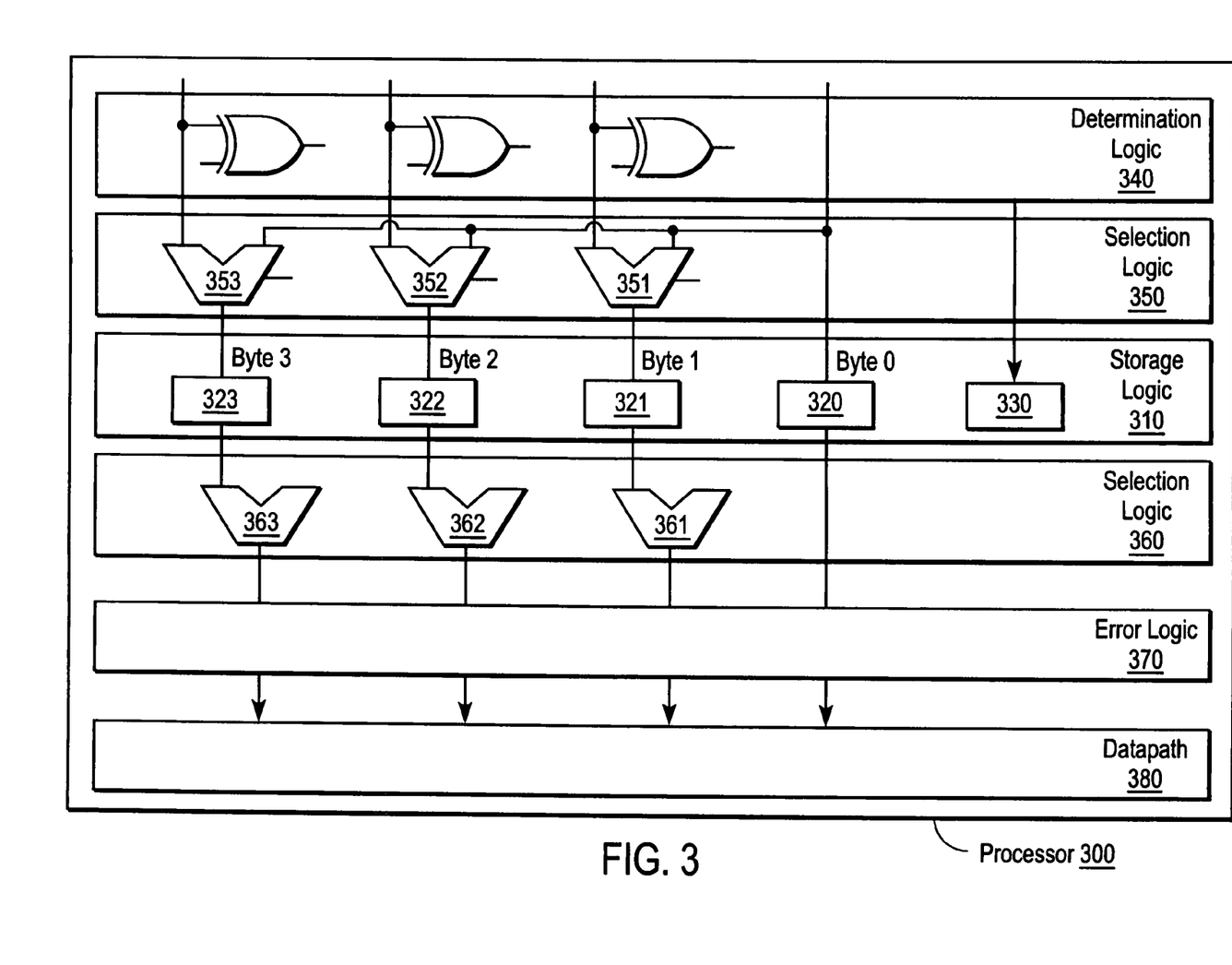
FIG. 3 illustrates an embodiment of the present invention in a processor having redundant storage logic and narrow value determination logic.

Another embodiment of the present invention is shown in FIG. 3. FIG. 3 includes processor 300, which includes storage logic 310, which includes byte-0 storage logic 320, byte-1 storage logic 321, byte-2 storage logic 322, byte-3 storage logic 323, and indicator storage logic 330.

Processor 300 also includes determination logic 340, which determines whether the dataword to be stored is a narrow value as described above. If determination logic 340 determines that the dataword is a narrow value, then an indicator bit is set in indicator storage logic 330.

Processor 300 also includes selection logic 350, which includes selection logic 351, 352, and 353. Selection logic 351 selects either byte-0 or byte-1 of the dataword to store in byte-1 storage logic 321, selection logic 352 selects either byte-0 or byte-2 to store in byte-2 storage logic 322, and selection logic 353 selects either byte-0 or byte-3 to store in byte-3 storage logic 323. In each case, byte-0 is stored if determination logic 340 determines that the dataword to be stored is a narrow value. Therefore, redundant copies of byte-0 may be stored to provide for the detection and correction of soft errors as described below.

Processor 300 also includes selection logic 360, which includes selection logic 361, 362, and 363. Selection logic 361 selects either the contents of byte-1 storage logic 321 or a replacement value, selection logic 362 selects either the contents of byte-2 storage logic 322 or a replacement value, and selection logic 363 selects either the contents of byte-3 storage logic 323 or a replacement value. Each selection is based on the contents of indicator storage logic 330, such that the replacement value is selected if the indicator bit indicates that the stored dataword is a narrow value. The replacement value is either all zeroes if the highest order bit of the lowest order byte is a zero, or all ones if the highest order bit of the lowest order byte is a one. Alternatively, since the lowest order byte is replicated in each other byte location, the replacement value for each byte may be formed by copying the highest order bit of each byte to each other bit of the corresponding byte.

In other embodiments, determination logic 340 may determine if all of the bits in the upper order bytes are zeroes, and the replacement values may be all zeroes, or determination logic 340 may determine if all of the bits in the upper order bytes are ones, and the replacement values may be all ones, or determination logic 340 may determine if either condition exists, and both replacement values may be available.

Processor 300 also includes error logic 370, which may perform error detection or error correction. Error logic 370 may perform error detection by comparing each of the bytes read from storage logic 310 to each other, in any number of ways, such as comparing each of the upper order bytes to the lowest order byte, comparing each byte to each other byte, or any other way. If any such comparison determines that any one byte does not match any other byte, then error logic 370 indicates that there is an error in the data read from storage logic 310, using any known approach, such as generating a fault or exception.

The comparisons may be performed only when the contents of indicator storage logic 330 indicates that a narrow value is stored, or may be performed regardless of the contents of indicator storage logic 330 but the results of the comparison ignored unless indicator storage logic 330 indicates that a narrow value is stored.

Processor 300 also includes datapath 380 for reading data out of storage logic 310 to a destination.

Error logic 370 may perform error correction by performing the comparisons as described above, then, if any mismatches are found, ignoring the data from the byte that is different from the other bytes. For example, if the data from byte-0 storage logic 320, byte-1 storage logic 321, and byte-2 storage logic 322 is all the same, but the data from byte-3 storage logic 323 is different, the data from byte-3 storage logic 323 may be ignored and the data from byte-0 storage logic 320 may be read out onto datapath 380 as the value of byte-0 of the stored dataword. Or, if the data from byte-1 storage logic 321, byte-2 storage logic 322, and byte-3 storage logic 323 is all the same, but the data from byte-0 storage logic 320 is different, the data from byte-0 storage logic 320 may be ignored and the data from byte-1 storage logic may be read out onto datapath 380 as the value of byte-0 of the stored dataword.

Note that the comparisons described above may detect multiple errors. For example, the data from byte-0 storage logic 320, byte-1 storage logic 321, and byte-2 storage logic 322 may all be the same, but the data from byte-3 storage logic 323 may differ from that data in two bit locations, which would be interpreted as a double bit error. Or, the data from byte-0 storage logic 320 and byte-1 storage logic 321 may be the same, and the data from byte-2 storage logic 322 may differ from that data in one bit location, and the data from byte-3 storage logic 323 may differ in a different bit location, which would be interpreted as a double bit error.

Accordingly, the table below indicates possible actions that may be taken depending on the number and location of errors detected by error logic 370. The values in the first four columns represent the number of errors found in the byte indicated in the column header. As may be seen from the table, the use of embodiments of the present invention may be desirable to provide for detection and correction of multiple bit errors. Other tables of actions are possible in other embodiments.

| Byte 0 | Byte 1 | Byte 2 | Byte 3 | Action |
|---|---|---|---|---|
| 0 | 0 | 0 | 1 | correct error |
| 0 | 0 | 0 | 2 | correct error |
| 0 | 0 | 1 | 1 | correct error if bytes 2 and 3 are different, detect error if bytes 2 and 3 are the same |
| 0 | 0 | 0 | 3 | correct error |
| 0 | 0 | 1 | 2 | correct error |
| 0 | 1 | 1 | 1 | detect error if bytes 1, 2, and 3 are different, fault if bytes 1, 2, and 3 are the same |
| 0 | 0 | 0 | 4 | correct error |
| 0 | 0 | 1 | 3 | correct error |
| 0 | 0 | 2 | 2 | correct error if bytes 2 and 3 are different, detect error if bytes 2 and 3 are the same |
| 0 | 1 | 1 | 2 | detect error |
| 1 | 1 | 1 | 1 | detect error if bytes 0, 1, 2, and 3 are different, fault if bytes 0, 1, 2, and 3 are the same |

Figure 4:
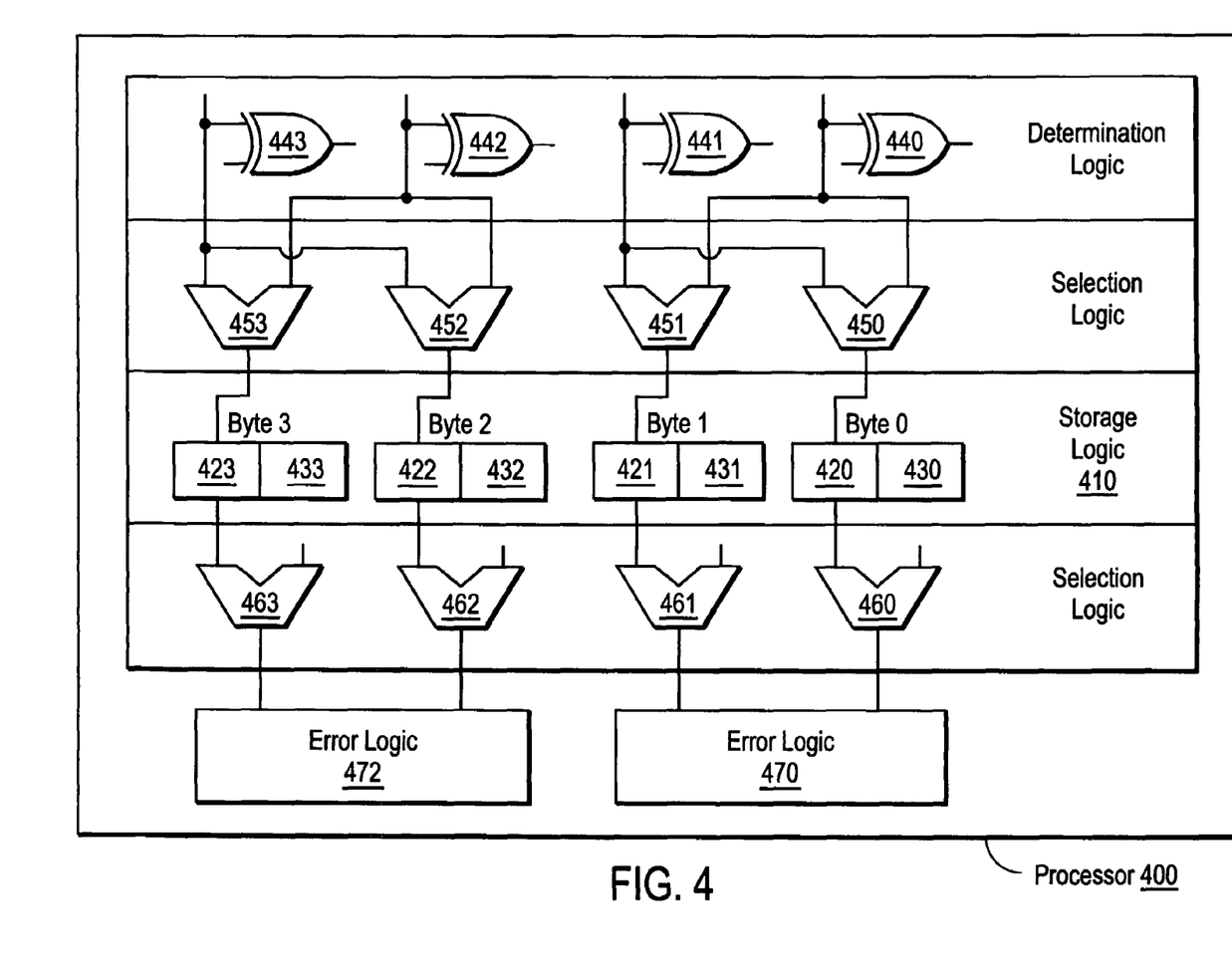
FIG. 4 illustrates an embodiment of the present invention in a processor having redundant storage logic and zero byte determination logic.

Yet another embodiment of the present invention is illustrated in FIG. 4. FIG. 4 includes processor 400, which includes storage logic 410, which includes byte-0 storage logic 420, byte-1 storage logic 421, byte-2 storage logic 422, byte-3 storage logic 423, indicator storage logic 430, indicator storage logic 431, indicator storage logic 432, and indicator storage logic 433.

Processor 400 also includes determination logic 440, 441, 442, and 443, which determine whether the byte of the dataword to be stored in byte-0 storage logic 420, byte-1 storage logic 421, byte-2 storage logic 422, and byte-3 storage logic 423, respectively, is a zero byte. If determination logic 440, 441, 442, or 443 determines that the corresponding byte is a zero byte, then an indicator bit is set in the indicator storage logic 430, 431, 432, or 433, respectively.

Processor 400 also includes selection logic 450, 451, 452, and 453. Selection logic 450 selects byte-0 of the dataword to store in byte-0 storage logic 420 if determination logic 440 determines that byte-0 is not a zero byte, or byte-1 if byte-0 is a zero byte but byte-1 is not. Selection logic 451 selects byte-1 of the dataword to store in byte-1 storage logic 421 if determination logic 441 determines that byte-1 is not a zero byte, or byte-0 if byte-1 is a zero byte but byte-0 is not. In this way, byte-0 storage logic 420 and byte-1 storage logic 421 are grouped to provide redundant storage for each other.

Similarly, selection logic 452 selects byte-2 of the dataword to store in byte-2 storage logic 422 if determination logic 442 determines that byte-2 is not a zero byte, or byte-3 if byte-2 is a zero byte but byte-3 is not. Selection logic 453 selects byte-3 of the dataword to store in byte-3 storage logic 423 if determination logic 443 determines that byte-3 is not a zero byte, or byte-2 if byte-3 is a zero byte but byte-2 is not.

Processor 400 also includes selection logic 460, 461, 461, and 463. Selection logic 460 selects a zero byte replacement value to be read from byte-0 storage logic 420 if indicator storage logic 430 indicates that a zero byte is stored in byte-0 storage logic 420, otherwise the contents of byte-0 storage logic 420 is read out. Selection logic 461 selects a zero byte replacement value to be read from byte-1 storage logic 421 if indicator storage logic 431 indicates that a zero byte is stored in byte-1 storage logic 421, otherwise the contents of byte-1 storage logic 421 is read out. Selection logic 462 selects a zero byte replacement value to be read from byte-2 storage logic 422 if indicator storage logic 432 indicates that a zero byte is stored in byte-2 storage logic 422, otherwise the contents of byte-2 storage logic 422 is read out. Selection logic 463 selects a zero byte replacement value to be read from byte-3 storage logic 423 if indicator storage logic 433 indicates that a zero byte is stored in byte-3 storage logic 423, otherwise the contents of byte-3 storage logic 423 is read out.

In other embodiments, determination logic 440, 441, 442, and 443 may additionally or instead determine if all of the bits in the upper order bytes are ones, and the replacement values may be all ones.

Processor 400 also includes error logic 470 and error logic 472. Error logic 470 may perform error detection by comparing the contents of byte-0 storage logic 420 to the contents of byte-1 storage logic 421, and if they do not match, indicating that there is an error in the data read from storage logic 410. Error logic 472 may perform error detection by comparing the contents of byte-2 storage logic 422 to the contents of byte-3 storage logic 423, and if they do not match, indicating that there is an error in the data read from storage logic 410.

The first comparison may be performed only when the contents of indicator storage logic 430 or 431 indicate that there is a redundant value stored (i.e., that a zero byte was detected), and the second comparison may be performed only when the contents of indicator storage logic 432 or 433 indicate that there is a redundant value stored. Alternatively, the comparisons may be performed regardless of the contents of indicator storage logic 430, 431, 432, and 433, but the results of the comparisons ignored unless the corresponding indicator storage logic indicates that a redundant value is stored.

Other embodiments may provide for the different groupings of bytes. For example, byte-0 and byte-2 may be grouped together and byte-1 and byte-3 may be grouped together. Or, more than two bytes of storage logic may be grouped together, so that error correction may be possible.

Any of the above embodiments, or any other embodiments of the present invention may divide word storage logic into subword storage logic of a size other than a byte. The choice of the subword size may depend on the typical size of narrow or zero values in a given processor, and involves tradeoffs between the number of narrow or zero values detectable and the number of bits protected or available for redundancy when a narrow or zero value is detected.

Also, in addition to or instead of the definition of a narrow value provided above, a narrow value may be any dataword that includes any number of bits the values of which are not required for correct execution or architectural state. That portion of a narrow value that is required is referred to as the required portion of the narrow value.

Furthermore, the narrow or zero value indicator bits as described above are themselves vulnerable to soft errors, and therefore it may be desirable to protect them with ECC or parity. However, in embodiments where the ignorable bytes are not used for redundant storage, an error in such a bit will not endanger correct architectural state when the error flips the bit from indicating that bytes are ignorable, because in that case the bytes will be read as if there were no such bit.

Figure 5:
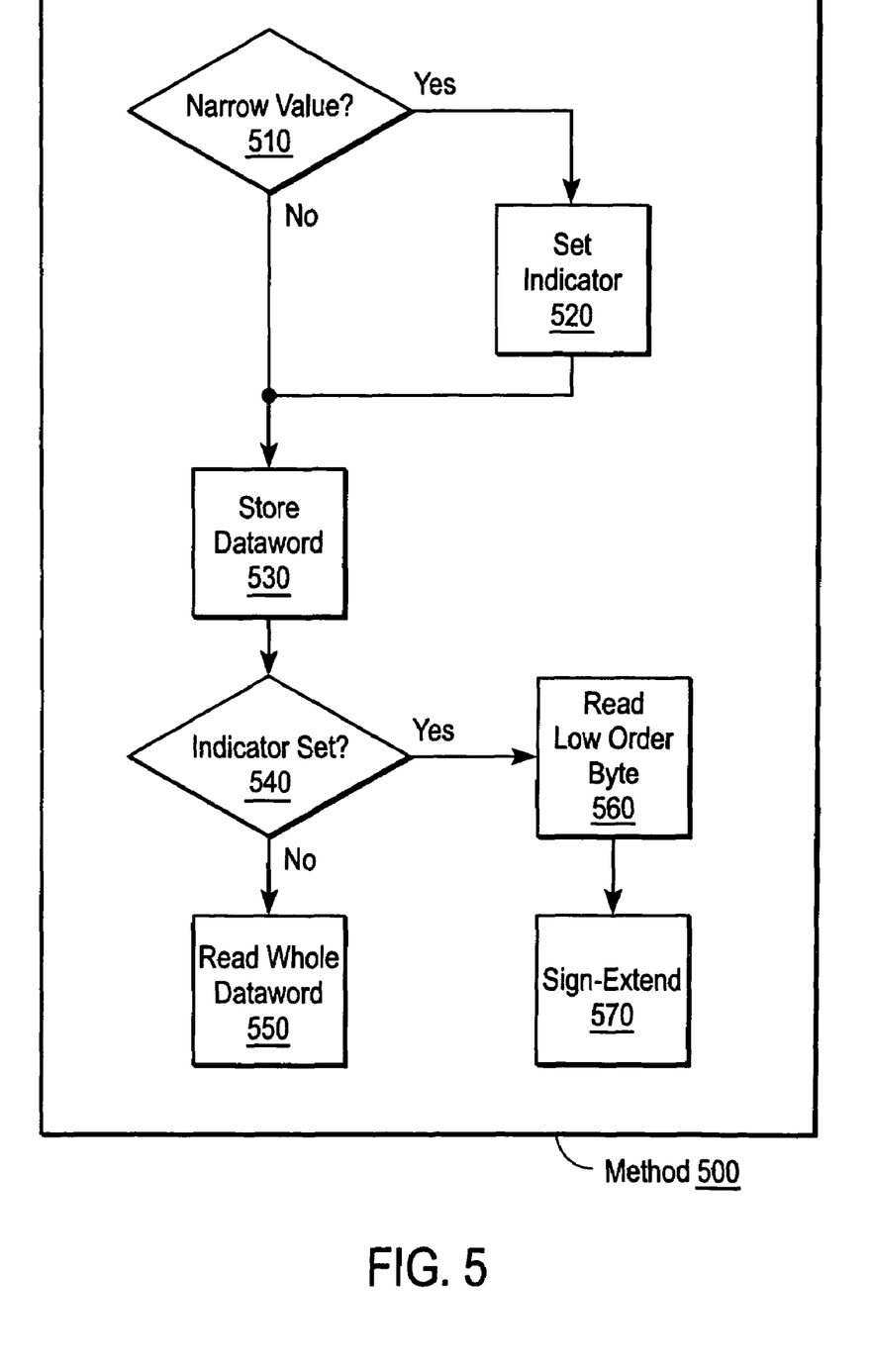
FIG. 5 illustrates another embodiment of the present invention in a method for reducing the soft error vulnerability of stored data representing a narrow value.

FIG. 5 illustrates an embodiment of the present invention in method 500 for reducing the vulnerability of stored data to soft errors. In box 510, a dataword to be stored in a processor is checked to determine if it is a narrow value. If it is, then in box 520, a narrow value indicator is set. In box 530, the dataword is stored. In box 540, the narrow value indicator is read to determine if the dataword to be read from storage is a narrow value. If it is not, then, in box 550, the whole dataword is read out. If it is, then, in box 560, the lowest order byte of the dataword is read out, and in box 570, the lowest order byte is sign-extended to provide the higher order bytes.

Figure 6:
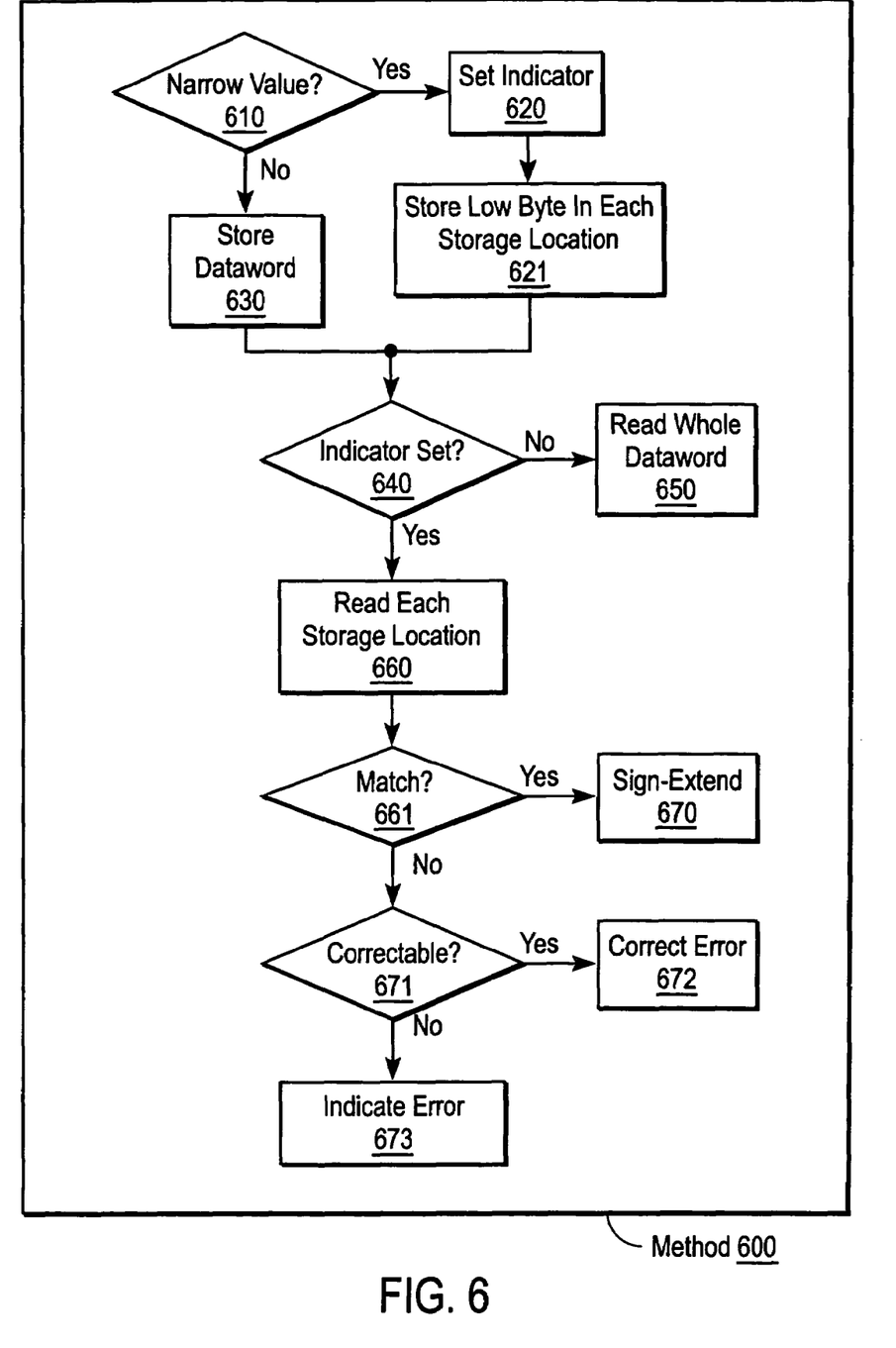
FIG. 6 illustrates an embodiment of the present invention in a method for detecting and correcting soft errors in stored data representing a narrow value.

FIG. 6 illustrates an embodiment of the present invention in method 600 for reducing the vulnerability of stored data to soft errors. In box 610, a dataword to be stored in a processor is checked to determine if it is a narrow value. If it is, then in box 620, a narrow value indicator is set to indicate that the dataword to be stored is a narrow value, and in box 621, the lowest order byte is stored in each storage location for each byte of the dataword. If it is not, then in box 630, each byte of the dataword is stored in a corresponding storage location. In box 640, the narrow value indicator is read to determine if the dataword to be read from storage is a narrow value. If it is not, then in box 650, the whole dataword is read out. If it is, then in box 660, the contents of each storage location for the dataword are read. In box 661, the contents of each storage location are compared to each other. If there is a match, then in box 670, the contents of the lowest order storage location is sign-extended to provide the whole dataword. If there is not a match, then in box 671, the number of mismatches is evaluated to determine if the error is correctable. If it is, then in box 672, the error is corrected by reading out the contents of a storage location that does not contain an error and sign-extending it. If it is not, then in box 673, an error in the dataword is indicated.

Figure 7:
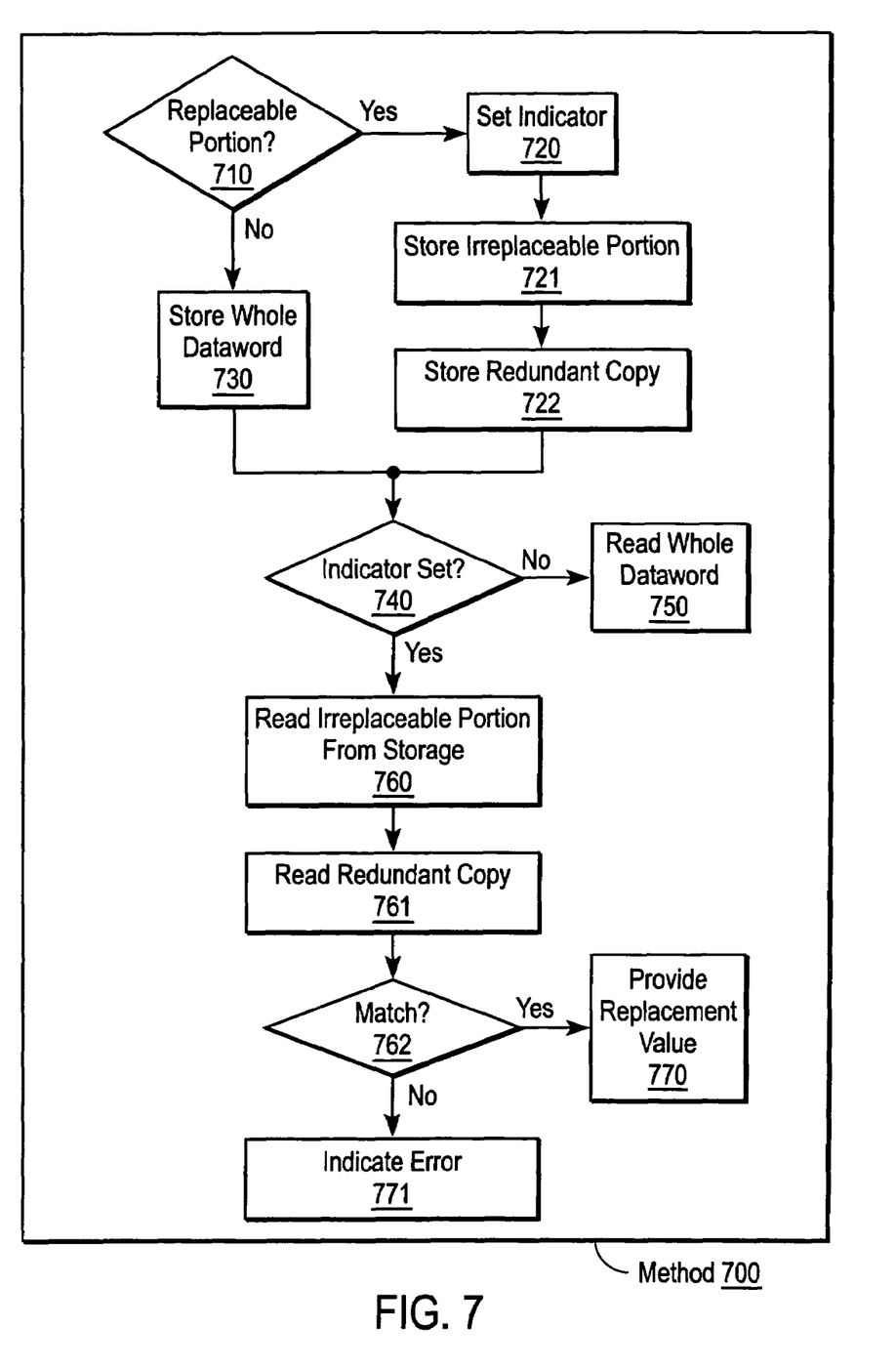
FIG. 7 illustrates an embodiment of the present invention in a method for reducing the soft error vulnerability of stored data including a replaceable portion.

FIG. 7 illustrates an embodiment of the present invention in method 700 for reducing the vulnerability of stored data to soft errors. In box 710, a dataword to be stored in a processor is checked to determine if it includes a replaceable portion, which may be a zero byte, a portion with the value of every bit equal to the value of every other bit, or any other portion than may be replaced by a predetermined replacement value. In the embodiment of FIG. 7, the dataword includes a low order byte and a high order byte, and the high order byte is checked to determine if it is replaceable. If it is, then in box 720, an indicator is set to indicate that the dataword to be stored includes a replaceable portion, in box 721, the low order byte is stored in a storage location for the low order byte, and in box 722, a redundant copy of the low order byte is stored in a storage location for the high order byte. If it is not, then in box 730, each byte of the dataword is stored in the corresponding storage location. In box 740, the indicator is read to determine if the dataword to be read from storage includes a replaceable portion. If it does not, then in box 750, the whole dataword is read out. If it does, then in box 760, the contents of the storage location for the low order byte are read, and in box 761, the contents of the storage location for the high order byte are read. In box 762, the contents of the storage location for the low order byte is compared to the contents of the storage location for the high order byte. If there is a match, then in box 770, a replacement value is provided for the high order byte. If there is not a match, then in box 771, an error in the dataword is indicated.

Within the scope of the present invention, the methods illustrated in FIGS. 5, 6, and 7 may be performed in a different order, with illustrated steps omitted, with additional steps added, or with a combination of reordered, combined, omitted, or additional steps. For example, in FIG. 6, boxes 671 and 672 (determining if the error is correctable and correcting the error, respectively) may be omitted if error detection is implemented without error correction.

Figure 8:
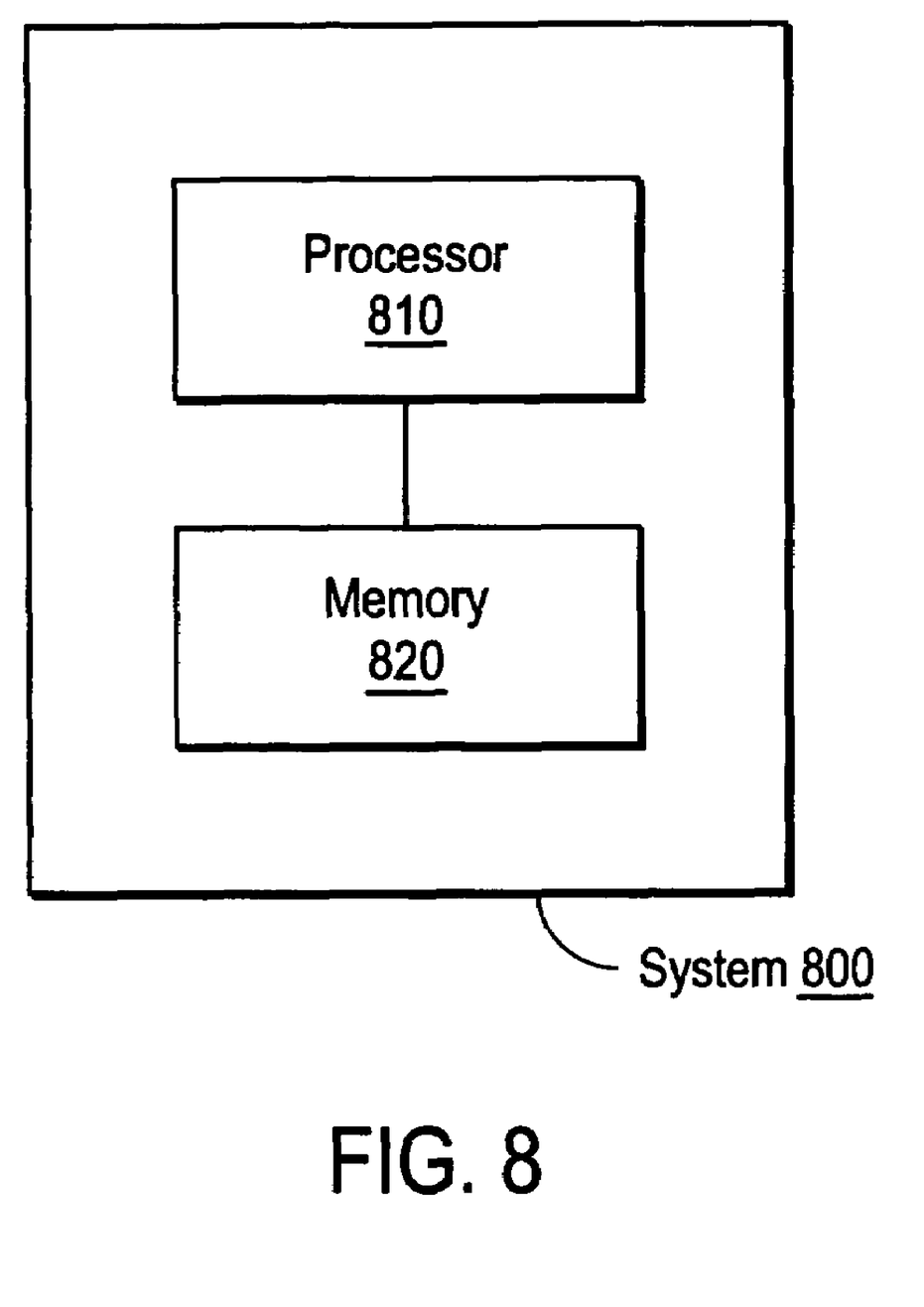
FIG. 8 illustrates an embodiment of the present invention in a data processing system.

FIG. 8 illustrates an embodiment of the present invention in system 800. System 800 includes processor 810 and system memory 820. Processor 810 may be any processor as described above. System memory 820 may be any type of memory, such as semiconductor-based static or dynamic random access memory, semiconductor-based flash or read only memory, or magnetic or optical disk memory. In system 800, system memory 820 may be the source of the dataword to be stored in storage logic in processor 810, or may be the destination of the dataword to be read from storage logic in processor 810.

Processor 810 and system memory 820 may be coupled to each other in any arrangement, with any combination of buses or direct or point-to-point connections, and through any other components. System 800 may include any number of buses, such as a peripheral bus, or components, such as input/output devices, not shown in FIG. 8.

Processor 100, 200, 300, or 400, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the acts of a communication provider or a network provider may be acts of making copies of an article, e.g., a carrier wave, embodying techniques of the present invention.

Thus, apparatuses and methods for reducing the soft error vulnerability of stored data have been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   first storage logic to store a first portion of a dataword;
   second storage logic to store a second portion of the dataword;
   determination logic to determine a condition of the dataword;
   third storage logic to store a result generated by the determination logic; and
   selection logic to select, based on the contents of the third storage logic, one of the contents of the second storage logic and a replacement value that depends on the contents of a predetermined bit of the first storage logic.

2. The apparatus of claim 1, wherein the first portion of the dataword is the least significant portion of the dataword.

3. The apparatus of claim 1, wherein the condition of the dataword is that the value of each bit of the second portion of the dataword is the same as the value of the most significant bit of the first portion of the dataword.

4. The apparatus of claim 1, wherein each bit of the replacement value is equal to the contents of the predetermined bit of the first storage logic.

5. The apparatus of claim 1, wherein the predetermined bit of the first storage logic is to store the most significant bit of the first portion of the dataword.

6. The apparatus of claim 1, wherein the first storage logic and the second storage logic are included in one of a register, an issue queue, a data cache, and a data holding latch.

7. An apparatus comprising:
   first storage logic to store a first portion of a dataword;
   second storage logic to store one of the first portion of the dataword and a second portion of the dataword;
   determination logic to determine a condition of the dataword;
   third storage logic to store a result generated by the determination logic;
   first selection logic to select, based on the result generated by the determination logic, one of the first portion of the dataword and the second portion of the dataword to store in the second storage logic; and
   second selection logic to select, based on the contents of the third storage logic, one of the contents of the second storage logic and a replacement value.

8. The apparatus of claim 7, wherein the condition of the dataword is that the value of each bit of the second portion of the dataword is the same as the value of each other bit of the second portion of the dataword.

9. The apparatus of claim 7, wherein the condition of the data is that the value of the second portion of the dataword is zero.

10. The apparatus of claim 7, wherein the replacement value is zero.

11. The apparatus of claim 7, wherein the first storage logic and the second storage logic are included in one of a register, an issue queue, a data cache, and a data holding latch.

12. The apparatus of claim 7, further comprising error detection logic to compare the contents of the first storage logic and the second storage logic.

13. The apparatus of claim 12, wherein the error detection logic is to compare the contents of the first storage logic and the second storage logic responsive to the contents of the third storage logic.

14. The apparatus of claim 7, further comprising:
fourth storage logic to score one of the first portion of the dataword and a third portion of the dataword;
third selection logic to select, based on the result generated by the determination logic, one of the first portion of the dataword and the third portion of the dataword to store in the fourth storage logic;
a datapath for reading a stored value from the first storage logic; and
error correction logic to compare the contents of the first storage logic, the second storage logic, and the fourth storage logic and, if the contents of the second storage logic are different from the contents of the first storage logic and the same as the contents of the fourth storage logic, to provide to the datapath the contents of the second storage logic instead of the contents of the first storage logic.

15. A method comprising:
determining that a dataword to be stored is a narrow value;
storing the required portion of the narrow value;
storing an indication that the stored data represents the narrow value;
reading the required portion of the narrow value from storage; and
providing a replacement value for the remainder of the dataword.

16. The method of claim 15, further comprising redundantly storing the required portion of the narrow value.

17. The method of claim 16, further comprising:
reading the redundantly stored required portion of the narrow value from storage; and
comparing the required portion of the narrow value to the redundantly stored portion of the narrow value to check for errors.

18. The method of claim 17, further comprising correcting an error in the required portion of the narrow value by providing the redundantly stored required portion of the narrow value instead of the required portion of the narrow value from storage.

19. A method comprising:
determining that a dataword to be stored includes an irreplaceable portion and a replaceable portion;
storing the irreplaceable portion;
storing a redundant copy of the irreplaceable portion;
storing an indication that stored data represents a dataword including a replaceable portion;
reading the irreplaceable portion from storage;
reading the redundant copy of the irreplaceable portion from storage; and
comparing the irreplaceable portion from storage and the redundant copy of the irreplaceable portion from storage to check for errors.

20. The method of claim 19, where the replaceable portion has a value of zero.

21. A system comprising:
a memory; and
a processor including:
first storage logic to store a first portion of a dataword;
second storage logic to store a second portion of the dataword;
determination logic to determine a condition of the dataword;
third storage logic to store a result generated by the determination logic; and
selection logic to select, based on the contents of the third storage logic, one of the contents of the second storage logic and a replacement value that depends on the contents of a predetermined bit of the first storage logic.

* * * * *